United States Patent
Moon et al.

[19]

[11] Patent Number: 5,892,145
[45] Date of Patent: *Apr. 6, 1999

[54] METHOD FOR CANCELING THE DYNAMIC RESPONSE OF A MASS FLOW SENSOR USING A CONDITIONED REFERENCE

[75] Inventors: Eric D. Moon, Goodyear; Robert E. Wahl, Tempe, both of Ariz.

[73] Assignee: AlliedSignal Inc., Morris Township, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 768,418

[22] Filed: Dec. 18, 1996

[51] Int. Cl.$^6$ .................................................. G01M 15/00
[52] U.S. Cl. ............................................... 73/118.2
[58] Field of Search ............................... 73/118.2, 202.5, 73/204.1, 204.22

[56] References Cited

U.S. PATENT DOCUMENTS

| | | |
|---|---|---|
| 3,901,620 | 8/1975 | Boyce . |
| 4,137,710 | 2/1979 | Preti et al. .................................. 60/223 |
| 4,449,401 | 5/1984 | Kaiser et al. . |
| 4,548,075 | 10/1985 | Mariano . |
| 4,562,731 | 1/1986 | Nishimura et al. . |
| 4,603,546 | 8/1986 | Collins .................................... 60/39.02 |
| 4,648,271 | 3/1987 | Woolf . |
| 4,949,276 | 8/1990 | Staroselsky et al. .................... 364/509 |
| 5,152,181 | 10/1992 | Lew . |
| 5,257,301 | 10/1993 | Vanderbilt . |
| 5,594,665 | 1/1997 | Walter et al. ............................ 364/558 |

*Primary Examiner*—Ronald Biegel
*Attorney, Agent, or Firm*—Jerry J. Holden

[57] ABSTRACT

The present invention provides a gas turbine engine surge control system comprising a pressure transducer positioned for sensing compressor discharge pressure, a hot wire anemometer positioned for sensing compressor discharge flow and temperature, means for electronically processing the signals from the sensors to obtain corrected compressor discharge flow without the use of look-up tables, and means for modulating a surge control valve based on corrected flow to prevent surge. The means for electronically processing said sensed signals incorporates means for canceling the dynamic response of the hot wire anemometer so as to have the effect of accelerating the response rate of the anemometer to match the response rate of the discharge pressure transducer.

24 Claims, 4 Drawing Sheets

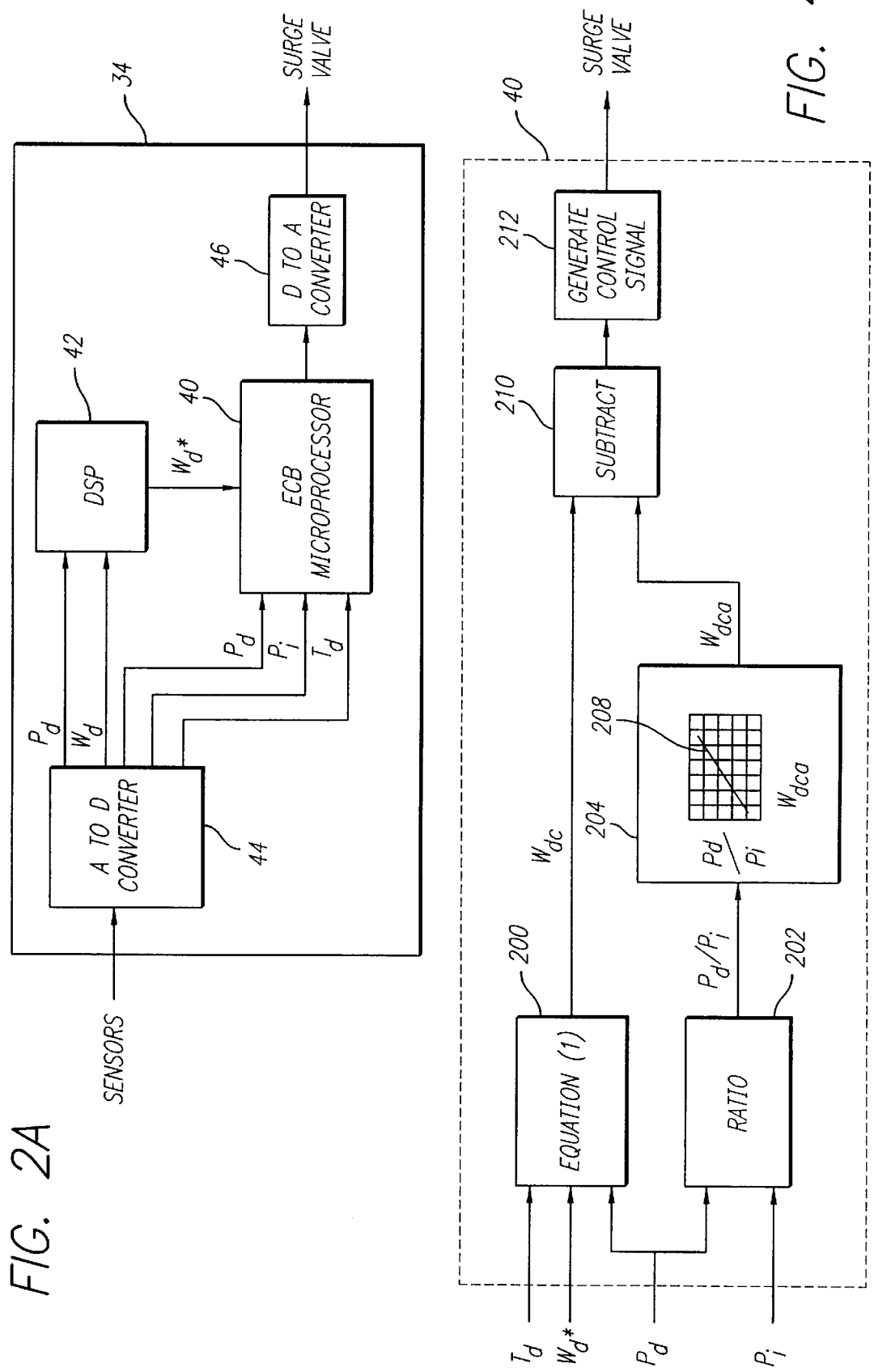

METHOD FOR CANCELING THE DYNAMIC RESPONSE OF A MASS FLOW SENSOR USING A CONDITIONED REFERENCE

TECHNICAL FIELD

This invention relates generally to methods for canceling the dynamic response of a mass flow sensor, and in particular, to the implementation of such a method in a gas turbine engine surge control system to cancel the dynamic response of a hot wire anemometer.

BACKGROUND OF THE INVENTION

To prevent compressor surge, gas turbine engines employ surge control systems. These control systems use corrected discharge flow $W_{dc}$, defined by equation (1), from the compressor to sense the proximity of surge.

$$W_{dc} = (W_d \times \sqrt{T_a/T_s})/(P_d/P_s) \tag{1}$$

Where $W_d$ is compressor discharge air flow, $T_a$ is discharge temperature, $T_s$ is standard day temperature, $P_d$ is total discharge pressure, and $P_s$ is standard day pressure.

Shown in FIG. 1, is a conventional pitot-static flow sensor used by some surge control systems to determine corrected discharge flow. Compressor discharge air flows through a conduit 2 and then is directed to the aircraft and/or overboard. The sensor includes a total pressure transducer 4 for measuring the total pressure in the conduit and a delta pressure transducer 6 for measuring the difference between total and static pressure in conduit 2. The sensor also has a variable volume chamber 8, a filter 10, and a directional control orifice 12. An electronic control box, ECB 14, containing a microprocessor receives the signals from the transducers, calculates $(P_d - P_{static})/P_d$ and uses this calculated value to enter a look-up table or algorithm to determine $W_{dc}$. If $W_{dc}$ is above a specified value indicative of a possible surge the ECB will command the surge control valve 16 to open. Disadvantages to this type of control system are the complexity of the pitot-static flow sensor and the dependence on look-up tables or algorithms. As the engine ages, these tables and algorithms become less and less representative of actual engine conditions, resulting in significant differences between the $W_{dc}$ used in the ECB and the actual $W_{dc}$ in the engine.

FIG. 2 shows a much simpler arrangement that only uses the total pressure transducer and a hot wire anemometer. The pressure transducer provides a pressure signal, and the hot wire anemometer provides both a signal proportional to discharge flow, and a temperature signal. The ECB receives these signals and then calculates the corrected discharge flow, thus eliminating look-up tables. A disadvantage to this system is the slow dynamic response of the hot wire anemometer to an abrupt or step change in flow. Because surge can occur very rapidly and cause catastrophic damage to the engine, the slow dynamic response of hot wire anemometers has limited their effectiveness in surge control systems.

Accordingly, there is a need for a surge control system in which the dynamic response of a hot wire anemometer is canceled from the measurement of compressor discharge flow without adversely affecting the accuracy of the measurement.

SUMMARY OF THE INVENTION

An object of the present invention is to provide a method for canceling the dynamic response of a hot wire anemometer.

Another object of the present invention is to provide a gas turbine engine surge control system in which the dynamic response of a hot wire anemometer used to measure compressor discharge flow is canceled.

The present invention achieves these objects by providing a gas turbine engine surge control system comprising a pressure transducer positioned for sensing compressor discharge pressure, a hot wire anemometer positioned for sensing compressor discharge flow and temperature, means for electronically processing the signals from the sensors to obtain corrected compressor discharge flow without the use of look-up tables, and means for modulating a surge control valve based on corrected flow to prevent surge.

The means for electronically processing said sensed signals further includes means for processing the anemometer and discharge pressure transducer signals so as to have the effect of accelerating the response rate of the anemometer to match the response rate of the discharge pressure transducer.

These and other objects, features and advantages of the present invention, are specifically set forth in, or will become apparent from, the following detailed description of a preferred embodiment of the invention when read in conjunction with the accompanying drawings.

BRIEF DESCRIPTION OF THE DRAWINGS

FIG. 2A is a schematic of the electronic control box portion of the surge control system of FIG. 2.

FIG. 4 is a schematic of the ECB microprocessor portion of the surge control system of FIG. 2.

DESCRIPTION OF THE PREFERRED EMBODIMENT

Figure 1:
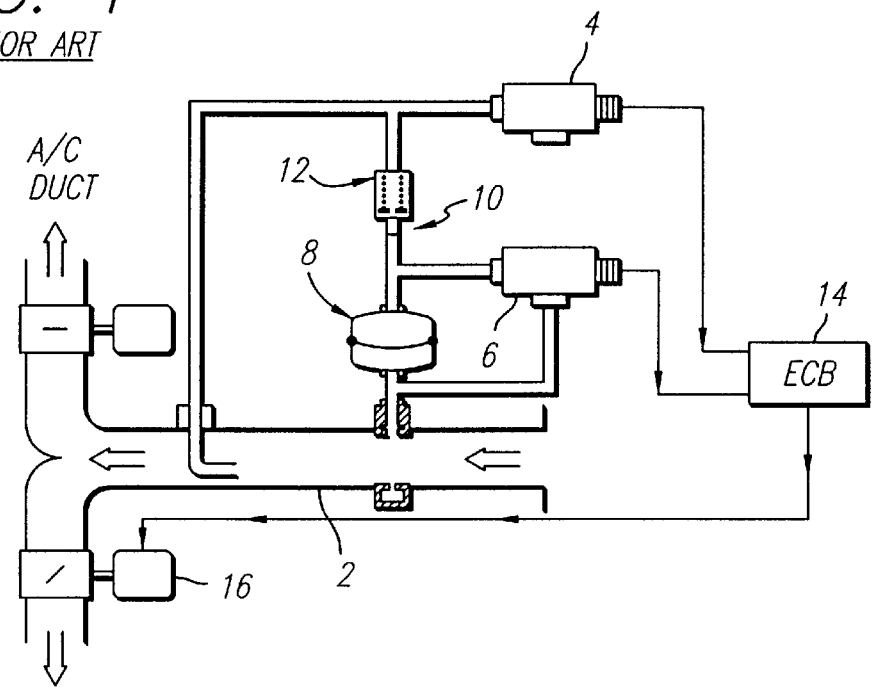
FIG. 1 is a schematic of a prior art gas turbine engine surge control system.
Figure 2:
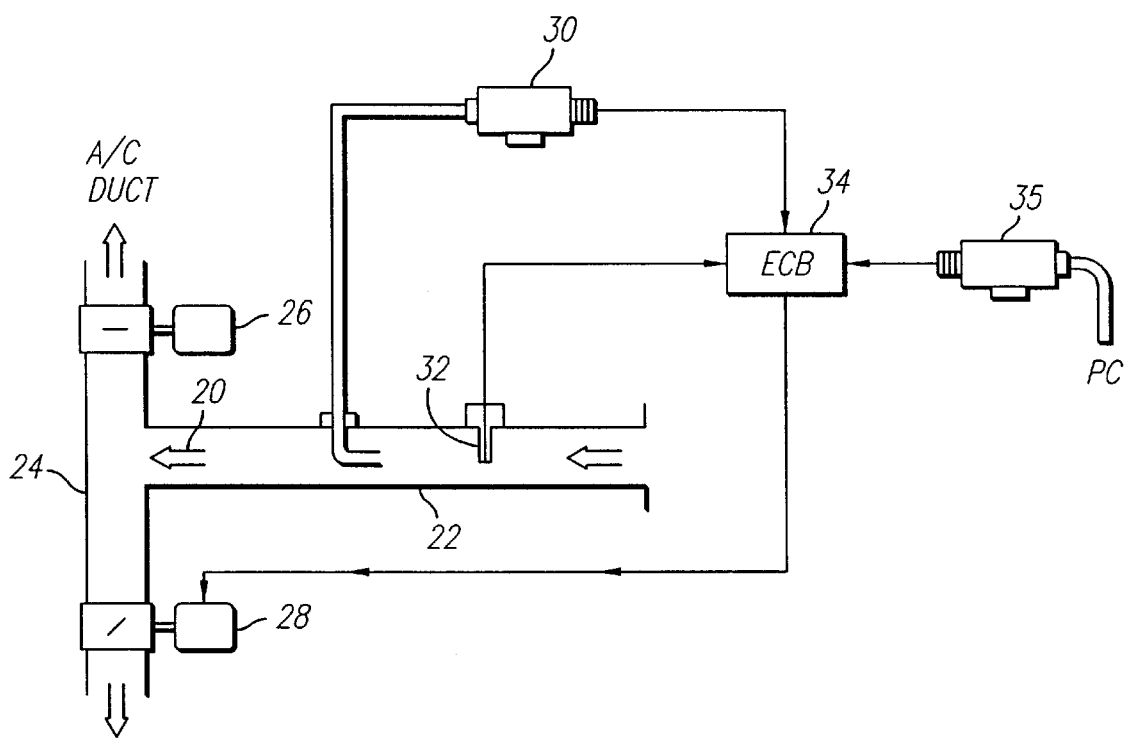
FIG. 2 is a schematic of a gas turbine engine surge control system as contemplated by the present invention that employs a hot wire anemometer to measure compressor discharge flow.

Referring to FIGS. 2 and 2A, compressor discharge air flow, $W_d$, represented by arrow 20 flows from the engine, not shown, through a conduit 22 and then into a second conduit 24 in which it is directed to the aircraft through a control valve 26 and/or overboard through a surge control valve 28. Mounted in the conduit is a pressure transducer 30 for sensing total discharge pressure, $P_d$, and a hot wire anemometer 32 for sensing discharge flow $W_d$ and temperature $T_d$. Should the control valve 26 close before the surge control valve 28 opens, the compressor will be driven into surge. Under these circumstances the flow in the conduit will spike downwards. This change in flow is so rapid that for control purposes it is considered as a step change. The decrease in flow may result in a temperature rise as well, however at a much slower rate. The transducer 30 and anemometer 32 sense this spike in flow and in response generates voltage signals. An electronic control box, ECB 34, receives the signals from the transducer and anemometer and calculates $W_{dc}$. If the calculated value of $W_{dc}$ is below a predetermined value, the ECB then commands the surge control valve 28 to open to the extent required to avoid a surge condition.

Referring to FIG. 2A, mounted within the ECB 34 is a microprocessor 40 for controlling the surge valve, and a digital signal processor (DSP) 42 such as the Texas Instruments TMS320C30. This signal processor was selected for its high speed and ability to execute floating point instructions. Also mounted within ECB 34 are a Burr-Brown DSP102 dual input analog to digital (A to D) converter 44 for providing input to the DSP and ECB microprocessors, and a Burr-Brown dual output digital to analog (D to A) converter 46 for providing output from the ECB to the surge valve. It is to be understood that alternatively other microprocessors, or a custom made chip in combination with other converters can be utilized in accordance with the broad aspects of the present invention.

The DSP 42 is positioned so as to condition the anemometer flow signal prior to the signal entering the ECB microprocessor 40. programmed into the DSP is a method for canceling the dynamic response of the hot wire anemometer. The method is referred to as the dynamic compensator routine (DCR). The DCR corrects for inaccuracies in the flow measurement caused by the slow response of the anemometer relative to the fast changes in mass flow during surge. The DCR is invoked each time the DSP receives new transducer and anemometer digital signals from the A to D converter, which preferably occurs every 25.33 microseconds.

The DCR is described below in reference to the flowchart of FIG. 3 as a series of functional blocks; each block receiving a signal, operating on that signal, and outputting an altered signal. The operation of each block may be described in terms of its transfer function, defined as the ratio of the block's output divided by its input. When this transfer function, or ratio, is of a type describable in terms of linear differential equations, it becomes possible and convenient to use Laplace functions and the Laplace variable s. Such is the case for the functional blocks of the DCR, and accordingly in FIG. 3, each block of the DCR is labeled in Laplace form.

It will be understood, however, that the DSP of the preferred embodiment performs discrete calculations in what is known as the z domain, as contrasted to continuous transformation in the frequency, or s domain. Thus, the DSP cannot directly utilize the transfer functions in Laplace format. Instead, the DSP approximates a continuous transformation by successively invoking the DCR routine at short time intervals, i.e. approximately 25 microseconds. The DCR routine converts the transfer function of each block into an infinite series type expression suitable for discrete calculation in the z domain, and upon each invocation performs the representative calculations for all blocks. Through repetition of this discrete calculation process, the DCR approximates the continuous conversion of the sensor signals defined by the Laplace expressions.

Accordingly, a literally precise description of DCR blocks would be in terms of the infinite series form expressions used by the DCR. The Laplace form was chosen instead because it is a far more recognizable and effective means of conveying the nature of the transforms being performed than the infinite series form within the DCR. Further, the Laplace form provides a means for viewing the whole dynamic canceling method in a simple algebraic format as will become apparent from the DCR description hereinbelow. Thus, wherein this description refers to the transfer functions of the DCR in Laplace form, it should be understood to be referring to the digital equivalent of the Laplace form. Similarly, where high-pass or low-pass filtering of signals and the like are described, such references are to be understood as meaning that it is the digital equivalent of those filtering operations that are being performed by the DCR.

Figure 3:
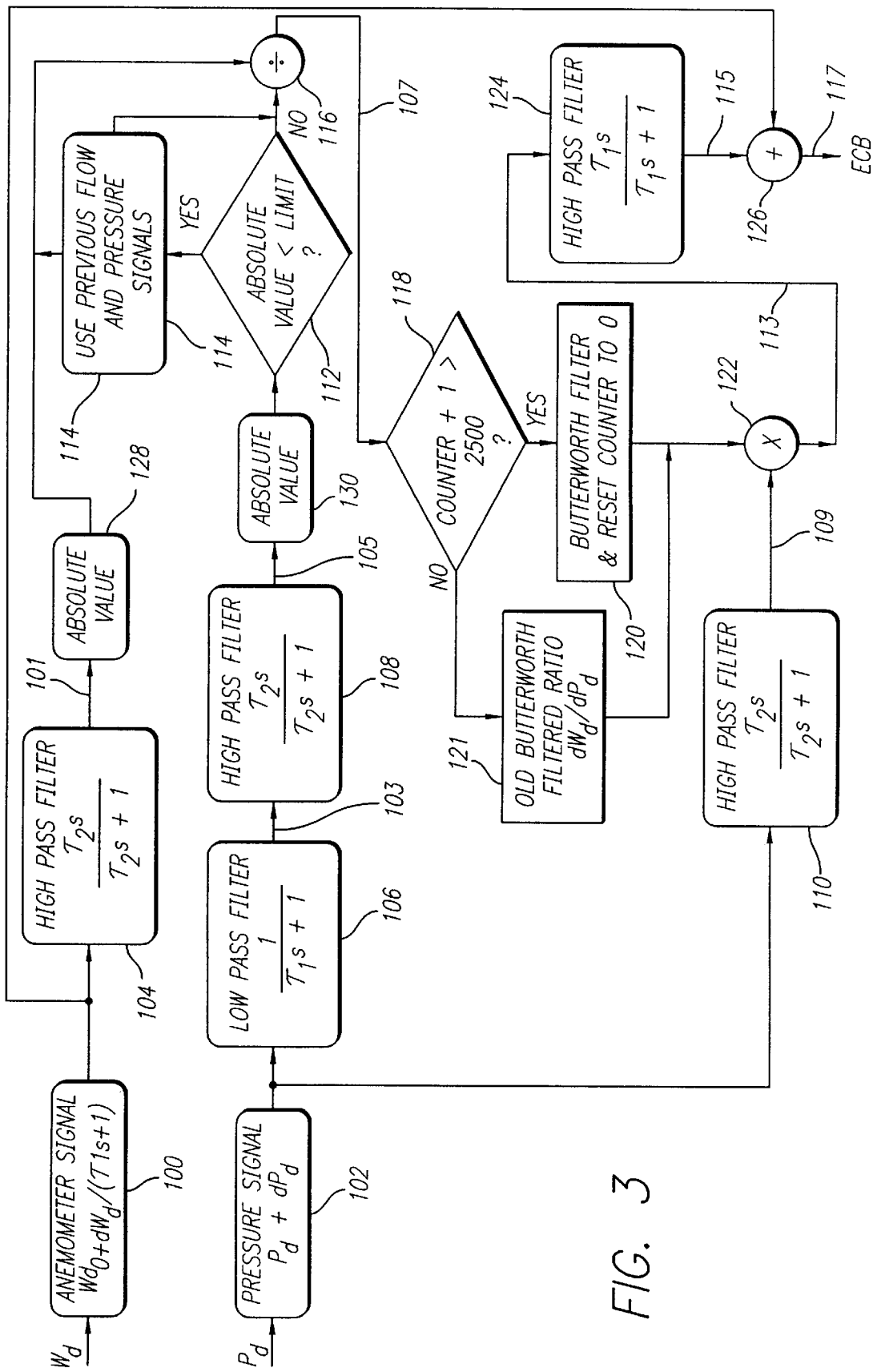
FIG. 3 is a flow chart of a method for canceling the dynamic response of the hot wire anemometer of FIG. 2.

Referencing the flowchart of FIG. 3, when the DCR is invoked new digital signals from the A to D converter are accessed from the shared memory. The digital signal representative of the hot wire anemometer signal is received and stored in block 100. This digital signal is comprised of a steady state value (DC) $Wd_0$ component indicative of the steady state compressor discharge flow, a transient component $dW_d$ indicative of a change in the compressor flow, and a natural transient response component $1/(\tau_1 s+1)$ anemometer. This natural transient response is also referred to as the dynamic response of the sensor. Likewise in block 102, the pressure transducer digital signal has a steady state component $P_d$ and a transient value $dP_d$ which are received and stored in memory. The dynamic or natural transient response of the pressure transducer are considered to be so fast that it can be ignored. The symbol "d" as used in this application is an abbreviation of delta meaning a change in a parameter.

Block 104 receives the signal $Wd_0 + dW_d/(\tau_1 s+1)$ from block 100 and high pass filters it using a transfer function of $\tau_2 s/(\tau_2 s+1)$, where $\tau_2$ is selected so as to block the steady state portion and allow the transient portion to pass through. The result, $dW_d \cdot \tau_2 s/[(\tau_2 s+1)(\tau_1 s+1)]$, indicated by reference numeral 101, is stored in memory and output to absolute value block 128 where the signal is made positive.

Block 106 receives the signal $P_{d+dPd}$ from Block 102 and low-pass filters it using a transfer function of $1/(\tau_1 s+1)$, where $\tau_2$ is much larger than $\tau_1$, so as to impart to the transient component of the pressure signal the natural transient response component of the anemometer signal. The result, $Pd_0 dP_d/(\tau_1 s+1)$ indicated by reference numeral 103, is stored in memory and output to block 108.

Block 110 receives the signal $P_d+dP_d$ from Block 102 and high-pass filters it using a transfer function of $\tau_2 s/(\tau_2 s+1)$ so as to block the steady state portion of the signal. The result $dP_d \cdot \tau_2 s/(\tau_2+1)$ indicated by reference numeral 109, is stored in memory and output to block 122.

Block 108 receives the reshaped pressure signal 103 and high pass filters it using the transfer function of block 104, so as to block the steady state (DC) portion. The result, $dP_d \cdot \tau_2 s/[(\tau_2 s+1)(\tau_1 s+1)]$ indicated by reference numeral 105, is stored in memory and output to absolute value block 130 where the signal is made positive.

Decision block 112 receives the absolute value of the pressure signal 105 from block 130 and compares it to a predetermined limit which is some low number. This is done to avoid dividing by zero later in Block 116 of the routine. If the absolute value of the pressure signal is less than the limit, Block 114 replaces the current flow and pressure values with the flow and pressure values from the previous iteration. Block 116 then receives either the current or previous pressure and flow signals and calculates their ratio. The resulting value, $dW_d/dP_d$ indicated by numeral 107, is stored in memory and output to Block 118. By calculating this ratio, the natural transient response component of the relatively slow responding anemometer have been canceled from the signals. The remainder of the DCR then functions essentially to isolate the flow portion of the ratio, and recombine it with the original static portion of the flow signal.

Decision block 118 incorporates a counter which counts the number of times through the DCR. If the count is greater than 2500, Block 120 is executed. Block 120 receives $dW_d/dP_d$ from Block 116 and low pass filters the signal using a fourth order, 1 radian per second Butterworth filter with a 0.707 damping coefficient. By breaking at a sufficiently high frequency, the Butterworth filter attenuates the spikes in the signal induced by the absolute value determinations in Block 116. The filtered $dW_d/dP_d$ signal is stored in memory and output to Multiplier block 122.

If the count of Block 118 is less than 2500, Block 120 is not executed. Instead, Block 118 recalls the last stored value of the filtered $dW_d/dP_d$ signal from block 120 and outputs that value to Multiplier block 122, with the result that the value of $dW_d/dP_d$ changes only once every 2500 times through the routine. The counter is required because the Butterworth filter calculations performed by Block 120 would require a precision exceeding the capability of the DSP were they to be performed at the rate at which the DCR is being invoked. Decision block 118, by branching to Block 120 at a greatly reduced rate, allows for reduced precision requirements.

Multiplier block 122 multiplies the $dW_d/dP_d$ filtered ratio signal received from either Block 121 or 120 with the $dP_d \cdot \tau_2 s/(\tau_2 s+1)$ signal received from Block 110. By choosing a sufficiently large value for $\tau_2$ the signal from Block 110 can be simplified to $dP_d$, thereby canceling with the denominator of the filtered ratio signal in multiplier block 122. The resultant value, $dW_d$ indicated by numeral 113, is representative of the transient portion of the mass flow signal, however at an accelerated response rate equal to that of the pressure transducer. This value is stored in memory and output to Block 124.

Block 124 receives signal dWd from Block 122 and high pass filters it using a transfer function of $\tau_1 s/(\tau_1 s+1)$. The result $dW_d \cdot \tau_1 s/(\tau_1 s+1)$, indicated by reference numeral 115, is output to Summer block 126. Finally, in Block 126 the desired value indicative of the total flow signal accelerated to the response rate of the pressure transducer is obtained by adding $dW_d \cdot_1 s/(\tau_1 s+1)$ from box 124 to $Wd_0 + dW_d/(\tau_1 s+1)$ from box 100. The result, $Wd_0 + dW_d$, is stored in memory as $W_d^*$, indicated by reference numeral 117, and output to the ECB microprocessor 40, thereby completing one pass through the dynamic compensator routine. The above sequence repeats each time new pressure transducer and anemometer signals are supplied to the DSP by the A to D converter.

The ECB microprocessor 40 receives the compensated flow signal Wd* and performs further processing in order to determine whether to open surge valve 18. This additional processing is shown schematically in FIG. 4. Block 200 receives the accelerated flow signal Wd from the DCR Block 100, the discharge pressure Pd from the transducer, and the discharge temperature Td from the anemometer, and calculates corrected discharge flow Wdc according to Equation (1). Block 202 receives discharge pressure Pd, and compressor inlet pressure P from an inlet pressure transducer 35 and calculates the compressor pressure ratio $P_d/P_i$. Block 204 represents a surge control map 206 wherein a surge control line 208 correlates discharge corrected flow with pressure ratio. Block 204 receives the calculated pressure ratio from block 202, goes to control line 208 and selects an allowable corrected discharge flow $W_{dca}$ a for that particular pressure ratio. Block 210 then receives allowable flow $W_{dca}$ from Block 204 and measured flow $W_{dc}$ from Block 200 and subtracts $W_{dca}$ from $W_{dc}$. If that value is less than zero, Block 212 then generates a command signal for opening surge valve 28 by the amount required to prevent surge.

In an alternative embodiment, a DSP could be programmed to perform the above described functions of the ECB microprocessor 40 in addition to the dynamic canceling routine. More generally, a single microprocessor capable of efficiently performing the described DSP and ECB functions may conceivably be custom designed for surge control use.

Figure 5:
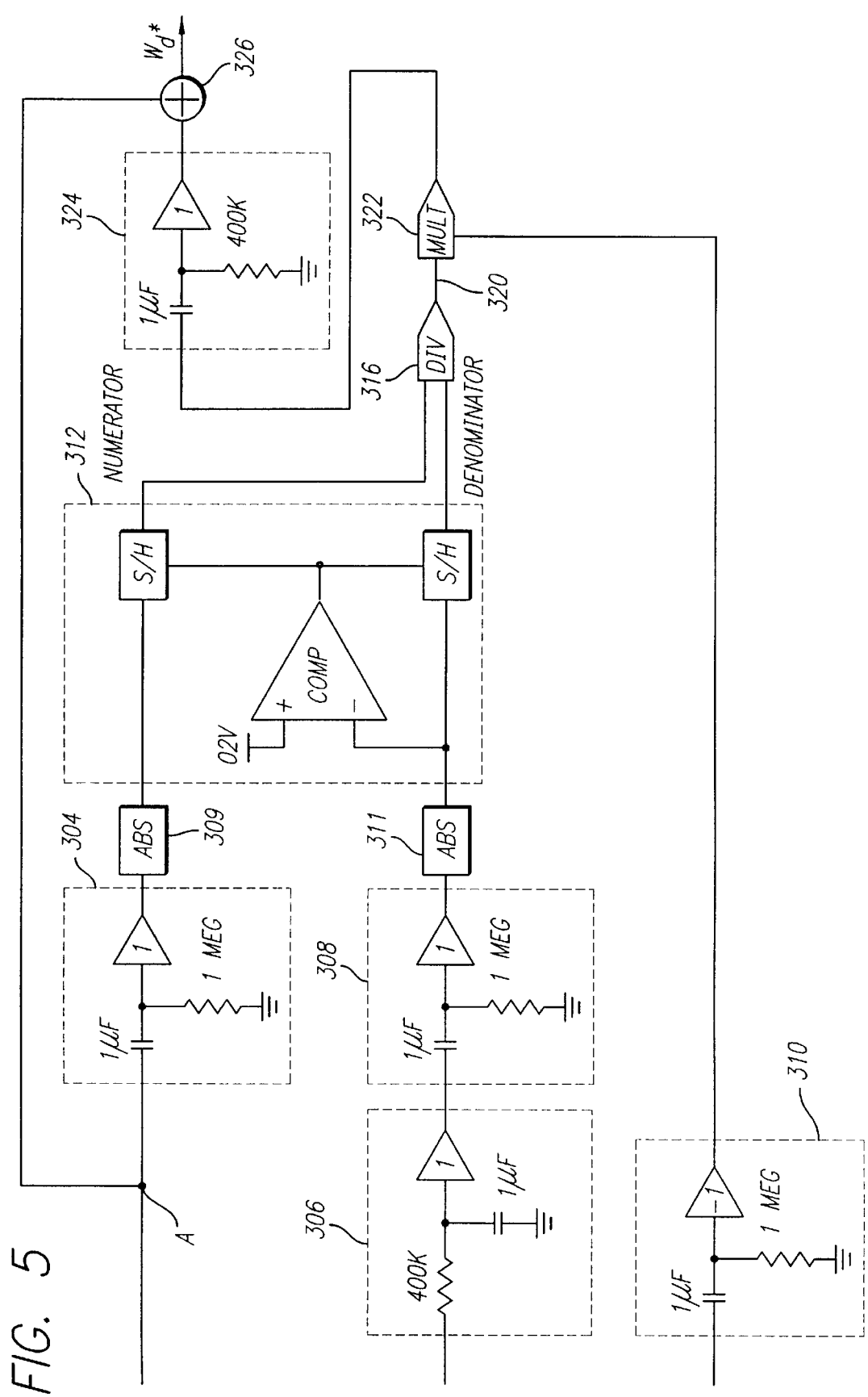
FIG. 5 is a schematic of an alternative method for canceling the dynamic response of the hot wire anemometer of FIG. 2.

In another alternative, an analog circuit according to the schematic of FIG. 5 may be substituted for the DSP of the preferred embodiment. The analog circuit duplicates the function of the dynamic canceling routine, having elements corresponding to the functional blocks described above in reference to FIG. 3. These corresponding elements in FIG. 5 are indicated by dotted line boxes surrounding electrical components that comprise the various elements. It will be apparent to one skilled in the art that the DCR of the preferred embodiment contains certain features such as the decision block 118 which are specific to a digital method, and therefore unnecessary in a continuous analog version. It will be further apparent that by substituting the analog circuit for the DSP, the need for an A to D converter between the sensors and the circuit would be obviated.

More specifically, block 304 comprises a high pass filter that receives the hot wire anemometer signal $W_d$ and filters it, blocking the steady state component of the anemometer signal while passing the transient component of the anemometer signal as well as the natural transient response component due to the anemometer. Low pass filter 306 receives and filters the the signal from the pressure transducer $P_d$, imparting to the signal the characteristic of the natural transient response of the hot wire anemometer. High pass filter 308 then filters the signal from block 306, blocking the steady state component. The signals are made positive in absolute value blocks 309 and 311.

Block 312 prevents divide by zero problems from occurring in block 316 by comparing the absolute values of the pressure (denominator) against a small test value. The pressure and flow signals are held constant by block 312 unless the pressure signal value exceeds the test value. Divider 316 receives the signals from block 312 and takes the ratio of the flow signal to the pressure signal. Multiplier 322 then multiplies the ratio signal from divider 316 with the pressure signal from the transducer that has been filtered by high pass filter 310, thereby cancelling the pressure signal from the ratio, leaving only the transient component of the flow signal. Preferably a Butterworth filter 320 filters the ratio signal from divider 316 before the multiplication step in multiplier 322. The steady state component flow of the signal is then reintroduced by filtering the transient component from block 322 in high pass filter 324, and combining the signal from block 324 with the hot wire anemometer signal in the summer 326.

The dynamic canceling method is not limited to turbine engine surge control applications. The method is generally applicable where it is desired to measure a fast changing parameter with a sensor too slow to keep up, but a known proportional relation exists between that parameter and another fast changing parameter that can be accurately measured. For example, the method could be applied in a turbine engine to measure engine gas temperature corrected by fuel flow measurement. Temperature sensors are generally slow responding, and unable to keep up with changes in engine gas temperature during rapid acceleration, however the corresponding changes in fuel flow can be accurately measured. By defining a proportional relationship between changes in engine gas temperature and changes in fuel flow, the slow temperature sensor response could be canceled, in effect accelerating the temperature measurement to the speed of the fuel measurement in the same way that discharge flow measurement was effectively accelerated to the rate of the pressure transducer in the preferred embodiment.

Various modifications and alterations to the above described preferred and alternate embodiments of the method for cancelling sensor dynamics will be apparent to those skilled in the art. Accordingly, these descriptions of the invention should be considered exemplary and not as limiting the scope and spirit of the invention as set forth in the following claims.

What is claimed is:

1. A method for measuring a rapidly changing first parameter with a first sensor at the speed of a significantly faster responding second sensor, comprising the steps of:

sensing a change in said first parameter with said first sensor and producing a first signal and sensing a change in a second parameter with a second sensor and producing a second signal, said first and second parameters being functionally related in a known way, and said signals each comprising a steady state component of said respective parameter, a transient component of said respective parameter, and a natural transient response component of said respective sensor wherein said natural transient response component of said second sensor is sufficiently fast that it can be ignored;

blocking said steady state components of said first and second signals;

reshaping said second signal to match said natural transient response component of said first sensor;

combining said first and second signals so as to cancel said natural transient response component of said first sensor from said combined signal; and extracting a third signal from said combined signal indicative of the actual first parameter at the time the measurement was made.

2. The method of claim 1, wherein said step of blocking said steady state components of said signals comprises high pass filtering said signals.

3. The method of claim 2, wherein said step of reshaping said second signal comprises low pass filtering said second signal with a filter having a transfer function descriptive of said natural transient response component of said first sensor.

4. The method of claim 3, wherein said step of combining further comprises:

taking a first absolute value of said blocked first signal;

taking a second absolute value of said blocked and reshaped second signal;

comparing said second absolute value against a predetermined small value;

holding said first and second absolute values constant unless said second absolute value is greater than said predetermined small value; and dividing said first absolute value by said second absolute value to produce said combined signal.

5. The method of claim 4, wherein said step of extracting said third signal comprises:

blocking said steady state component of the original second signal in parallel with and separate from said previously described blocking step;

smoothing spikes in said divisonally combined signal incurred by said absolute value calculation;

multiplicatively combining said separately blocked of second signal with said smoothed divisionally combined signal, thereby canceling out said second signal transient component and leaving only said transient component of said first signal; and recombing said transient component of said first signal with said steady state component of said first signal.

6. The method of claim 5, wherein said step of separately blocking said original second signal comprises high pass filtering said second signal.

7. The method of claim 6, wherein said step of recombining said transient component and said steady state component of said first signal comprises:

applying a transfer function to said transient component of said first signal such that by adding said transient component to said original sensed first signal the natural transient response component is canceled out; and adding said transient component having said transfer function to said original sensed first signal.

8. The method of claim 7, wherein said step of applying said transfer function to said transient component of said first signal comprises high pass filtering said signal.

9. The method of claim 8, wherein said step of smoothing spikes in said divisionally combined signal is carried out using a Butterworth filter.

10. A method for controlling engine surge in a gas turbine engine having an inlet, a compressor stage, and a turbine stage, comprising the steps of:

sensing engine inlet pressure using an inlet pressure transducer sensor, sensing compressor discharge pressure using a discharge pressure transducer sensor, and sensing compressor discharge flow and temperature using a hot wire anemometer sensor, said discharge pressure transducer and said hot wire anemometer sensors each producing a signal comprising a steady state component, a transient component, and a natural transient response component, said natural transient response component of said discharge pressure sensor being sufficiently fast that it can be ignored;

electronically processing the discharge pressure signal and the hot wire anemometer flow signals to compensate for the natural transient response of said hot wire anemometer, comprising the steps of:

blocking said steady state components of said discharge pressure signal and said anemometer flow signal;

reshaping said discharge pressure signal to match said natural transient response component of said anemometer flow signal;

combining said anemometer flow signal and said discharge pressure signal so as to cancel the natural transient response component of said anemometer flow signal from said combined signal; and extracting a compensated discharge flow signal from said combined signal;

further electronically processing said compensated discharge flow signal with said discharge pressure and temperature signals to obtain actual corrected compressor discharge flow;

processing said inlet and discharge pressure signals to obtain an allowable corrected compressor discharge flow; and modulating a surge control valve based on the relative values of said actual and allowable corrected flows to prevent surge.

11. The method of claim 1, wherein said blocking step comprises high pass filtering said signals.

12. The method of claim 11, wherein said step of reshaping comprises low pass filtering said discharge pressure signal with a filter having a transfer function descriptive of said natural transient response component of said anemometer flow signal.

13. The method of claim 12, wherein said step of canceling the natural transient response component of said anemometer flow signal comprises:

taking the absolute value of said transient portions of said discharge pressure signal and said anemometer flow signal;

comparing said absolute value of the transient portion of the discharge pressure signal against a predetermined small value;

holding said absolute values of said anemometer flow signal transient portion and transient portion of the discharge pressure signal constant unless said transient portion of the discharge pressure signal is greater than said predetermined small value; and dividing said absolute value of said anemometer flow signal transient portion by said absolute value of said discharge pressure transient signal.

14. The method of claim 13, wherein said step of extracting said compensated discharge flow signal comprises:

blocking said steady state portion of the original discharge pressure signal in parallel with and separate from said previously claimed blocking step;

smoothing spikes in said divisionally combined signal incurred by said absolute value calculation;

multiplicatively combining said separately blocked discharge pressure signal with said divisionally smoothed combined signal thereby cancelling out said the transient portion of said discharge pressure signal and leaving said transient component of said anemometer flow signal; and recombining said transient component of said anemometer flow signal with said steady state component of said anemometer flow signal.

15. The method of claim 14, wherein said step of separately blocking said steady state portion of said discharge pressure signal comprises high pass filtering said discharge pressure signal.

16. The method of claim 15, wherein said step of recombining comprises:

applying a transfer function to said transient component of said anemometer flow signal such that by adding said transient component to said original sensed anemometer flow signal, the natural transient response component is canceled out; and adding said transient component having said transfer function to said original sensed anemometer flow signal.

17. The method of claim 16, wherein said step of applying said transfer function to said transient component of said anemometer flow signal comprises high pass filtering said transient component of said anemometer flow signal.

18. The method of claim 17, wherein a Butterworth filter is utilized for said step of smoothing spikes in said divisonally combined signal.

19. The method of claim 18, wherein said step of compensating for sensor dynamics further comprises digitizing said pressure discharge signal and said anemometer flow signal and processing said signals using a digital signal processor.

20. The method of claim 19, wherein a counter is used in combination with said Butterworth filter, said counter holding said Butterworth filtered divisionally combined signal constant unless the value of said counter exceeds a predefined number.

21. The method of claim 20, wherein said step of compensating for the natural transient response of said anemometer further comprises processing said signals using analog circuitry.

22. A gas turbine engine surge control system for a gas turbine engine having an inlet, a compression stage, and a turbine stage, comprising:

an inlet pressure transducer for sensing inlet pressure, a discharge pressure transducer sensor for sensing compressor discharge pressure, and a hot wire anemometer sensor for sensing compressor discharge flow and temperature, said discharge pressure transducer and said hot wire anemometer sensor each producing a signal comprising a steady state component, a transient component, and a natural transient response component, said natural transient response component of said discharge pressure sensor being sufficiently fast that it can be ignored;

means for electronically processing the discharge pressure signal and the hot wire anemometer flow signals to compensate for the natural transient response of the hot wire anemometer, comprising:

means for combining said anemometer flow signal and the discharge pressure signal;

means for canceling the natural transient response component of said anemometer flow signal from said combined signals; and means for extracting a discharge flow signal compensated for the natural transient response of said anemometer from said combined signal;

further means for electronically processing said compensated discharge flow signal with said discharge pressure and temperature signals to obtain actual corrected compressor discharge flow;

means for processing said inlet and discharge pressure signals to obtain an allowable corrected compressor discharge flow; and means for modulating a surge control valve based on the relative values of said actual and allowable corrected flows to prevent surge.

23. The surge control system of claim 22, wherein said means for compensating for the natural transient response of said anemometer further comprises means for digitizing said pressure discharge signal and said anemometer flow signal, and a digital signal processor for processing said digitized signals.

24. The surge control system of claim 23, wherein said means for compensating for the natural transient response of said anemometer comprises analog circuitry.

* * * * *